Patented Oct. 19, 1954

2,692,271

UNITED STATES PATENT OFFICE 2,692,271

METHOD OF EPOXIDATION

Frank P. Greenspan and Ralph J. Gall, Buffalo, N. Y., assignors to Buffalo Electro-Chemical Company, Inc., Tonawanda, N. Y.

No Drawing. Application August 23, 1950, Serial No. 181,117

4 Claims. (Cl. 260—348.5)

1

The present invention relates to a method of epoxidizing ethylenic compounds and particularly esters of unsaturated fatty acids, unsaturated aliphatic alcohols and the unsaturated fatty acids themselves. In broad aspect, epoxidation comprises a reaction at a point of unsaturation of the ethylene type in a carbon compound whereby the unsaturated linkage is by the addition of oxygen changed to an oxirane compound.

Many methods of epoxidation have been suggested. For instance, the ethylene linkage has been reacted upon by the employment of perbenzoic acid in a non-aqueous solvent such as chloroform and peracetic acid used in aqueous solution. Many other peracids have been found effective as epoxidizing agents, perphthalic and percamphoric, among others.

In general, epoxidation of the olefinic compound has been found to proceed best by the employment of peracetic acid and other similar per-compounds. Swern, in U. S. Patent 2,411,762, recommends that epoxidation be performed in special organic solvents, while Terry and Wheeler in 2,458,484 perform epoxidation under vigorous agitation of an aqueous solution of peracetic acid and an insoluble long chain olefinic material. See also Findley et al. J. A. C. S. 67, 412–414 (1945). All of these investigators recognize the necessity of maintaining relatively low temperatures in order to favor the formation of the epoxy compound and to lessen the production, at the olefinic linkage, ultimately of a dihydroxy compound or glycol, by reason of the formation of an hydroxy-acetoxy compound.

However, from a practical operating and commercial point of view, aqueous peracetic acid will be preferred as the epoxidizing agent by reason of its ready formation from acetic acid, glacial or aqueous, or from acetic anhydride by mere reaction with aqueous hydrogen peroxide and, as the latter is now available in high weight concentrations, corresponding high peracid concentrations are available for use.

When the olefinic linkage is reacted with a peracid, it is possible to obtain either or both of two end products; the one being the oxirane compound which may be illustrated broadly as

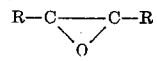

that is the epoxy compound, the other being the glycol, or derivative thereof, the former being represented by

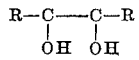

2

These are the possible end products, irrespective of any theoretical considerations of the mechanism of their formation, although in general the oxirane ring may be considered to be opened up with the production of a glycol by reaction with water, or the production of the hydroxy-acetoxy compound by reaction with acetic acid.

In an epoxidation reaction, several factors are important in determining the efficiency of reaction. One is the amount of the olefinic compound that has been changed in the reaction; another is the quantity of resultant product which exists in the oxirane condition, that is, the epoxy field, and a third is the amount of peracid used.

From the commercial aspect, epoxidized compounds are useful as plasticizers and stabilizers for certain polymers such as the polyvinyl chloride resins, as reaction intermediates and as resin modifiers. For many of these uses, residual unsaturation in the epoxy product is deleterious and often critical because of the tendency to yellowing under heat and light action. Existing methods of epoxidation are not ideal for the production of an end product with the desired low amount of unsaturation and maximum epoxy content.

The present invention produces a compound of high epoxy content together with low residual unsaturation. Whereas existing methods of epoxidation are generally wasteful in their practical application as they employ up to 20% excess of reagent, the present invention operates efficiently with substantially theoretical amount of reagent.

It is an object of the present invention to provide an effective method of epoxidation.

It is also an object of the present invention to provide a method for preparing epoxy fatty acid esters of high epoxy content and low residual unsaturation.

It is also an object of the invention to carry out an epoxidation reaction under chosen conditions with a high degree of efficiency, such that little more than stoichiometrical amounts of peracid are required.

It is also an object of the invention to utilize as the epoxidation reagent, peracetic acid of high concentration presently economically prepared from high concentration hydrogen peroxide with consequent greater operating efficiency and ease of recovery of acetic acid for reuse.

In broad aspect, the invention comprises three important factors:

1. The mixing of the olefinic compound with a peracid at relatively low temperature.

2. Effecting a major part of the epoxidation reaction at moderate temperature.

3. The completion of the epoxidation at temperatures heretofore considered relatively high for this reaction. See J. A. C. S. 67, p. 412.

Although peracids generally may be employed as epoxidizing agents, it will be found, as a practical matter, that peracetic acid will be the epoxidizing agent generally employed, and that acid has been used throughout the examples given hereinafter. The peracetic acid may be effectively prepared by reacting acetic acid with aqueous hydrogen peroxide in the presence of about 1% sulfuric acid as a reaction catalyst. The reaction proceeds with glacial acetic acid or aqueous acetic acid. The hydrogen peroxide may be the commercial 27.5% or 100 volume product or may be aqueous solutions of high peroxide content as, for instance, 50% to 90% $H_2O_2$. Peracetic acid may similarily be prepared by reaction of acetic anhydride with hydrogen peroxide by oxidation of aldehydes, U. S. Patent 2,314,385, or by the method described in U. S. Patent 2,490,800 issued December 13, 1949, to Greenspan.

When employing the resultant peracetic acid as the epoxidizing agent, it is necessary to neutralize any strong acid, e. g. sulfuric acid, present as catalyst from its formation. This may be done either by neutralizing the sulfuric acid content with an alkali, such as caustic soda, or by buffering the solution with a material such as sodium acetate.

In the preferred operating procedure of the present invention, peracetic acid of high peracid content, that is, one made from 50% or 90% hydrogen peroxide, is mixed with the olefinic compound at a temperature below 25° C. This mixing should be done either quite slowly and over an extended period of time, or under cooling, a particularly necessary precaution if the peracid is made from hydrogen peroxide of a strength of 50% or greater. After the reactants have been mixed under agitation, the system is thereafter further agitated for from one to three hours at a temperature below 25° C. With many compounds, extension of the reaction time beyond this period at the same temperature, results in little or no further epoxy formation. Where approximate stoichiometric amounts of peracid and olefinic compounds have been employed, at this time, 80% to 90% of the olefinic linkage will have reacted. If the epoxidation reaction be carried out at temperatures greatly above 25° C. ring opening will occur and the proportion of glycol derivative to epoxy derivative in the final product will be increased.

However, in accordance with the principles of the present invention, after the epoxidation reaction is apparently complete at the moderate temperature, the temperature of the reacting mixture is elevated to a relatively high temperature in the range 50° C. to 60° C. and reaction continued under agitation for an additional ½ hour to 2 hours. By this procedure, the proportion of the olefinic linkage that has been reacted upon is increased from 10 to 15% with corresponding increase in epoxy yield. Strangely enough, further reaction at this high temperature normally considered as accelerating ring opening of epoxy compounds, results in a net increase of epoxy content with completion of the reaction and consequent lowering of the residual unsaturation of the resultant product.

The following examples are given merely as illustrative of the invention rather than limitative of it, as the scope of the invention will be determined by the claims appended hereto.

A large number of esters of unsaturated fatty acids were epoxidized with 4% excess of peracetic acid by adding the peracetic acid to the ester over a period of 1 hour, and maintaining the temperature below 25° C. The reaction proceeded for an additional three hours at a temperature in the range 20° C. to 25° C. and was then raised to within the range 50° C. to 60° C., and left there for from ½ to 2 hours. The epoxidized products were then tested to determine the amount of epoxidation, i. e., the per cent of raw product reacted upon, as well as the epoxy yield, i. e., efficiency of the epoxidation reaction.

Table I

| Compound | Iodine Number | Percent Excess Peracid | Iodine Number Epoxidized Product | Percent Epoxy | Percent Epoxy Yield | Percent Reacted |
|---|---|---|---|---|---|---|
| Methyl Oleate | 83.7 | 4 | 2.5 | 4.33 | 84.5 | 97 |
| Cottonseed Oil | 96.6 | 4 | 3.8 | 4.70 | 82.0 | 96 |
| Oleyl Oleate | 88.6 | 4 | 1.8 | 4.27 | 80.8 | 98 |
| Soybean Oil | 135.0 | 4 | 3.0 | 6.50 | 83.0 | 97.8 |
| Olive Oil | 70.0 | 4 | 3.7 | 4.2 | 91.4 | 97 |
| Butyl Oleate | 72 | 4 | 1.4 | 4.2 | 97 | 98 |
| Methyl Ester of Soy Fatty Acids | 126.4 | 4 | 1.3 | 5.6 | 76.7 | 99 |
| Butyl Ester of Soy Fatty Acids | 84.7 | 4 | 3.4 | 4.1 | 80.0 | 96 |
| Methyl Ester of Cottonseed Fatty Acids | 93.5 | 4 | 2.0 | 4.6 | 83.0 | 98 |
| Butyl Ester of Cottonseed Fatty Acids | 83.0 | 4 | 1.2 | 4.0 | 81.5 | 98.5 |

The procedure given above is generally applicable to esters of unsaturated (ethylene) aliphatic acids. The unsaturated acid may be esterified with a monohydric or polyhydric alcohol. As noted above, the naturally occurring glyceride oils may be epoxidized directly. Although 40% peracetic acid has been employed in the illustrative examples, a peracid of lesser strength may be employed as the epoxidizing reagent just as effectively as the 40% product.

Although addition of peracid to olefin has been illustrated, olefin can similarly be added to peracid. Use of surface active agents has been found to be beneficial for lowering interfacial tension where the olefin and peracid are only partially miscible.

By similar procedures, unsaturated fatty acids and unsaturated aliphatic alcohols may be epoxidized with production of epoxidized end products of very low iodine numbers and a very low residual unsaturation together with a high proportion of unsaturated acid reacted upon. As with the unsaturated esters illustrated above, the temperature of the reaction mixture is raised to the range 50° C. to 60° C. to complete the expoxidation. The results were as follows:

*Table II*

| Compound | Iodine Number of Epoxidation Product | Percent Epoxy | Percent Epoxy Yield |
|---|---|---|---|
| Oleic Acid | 4.2 | 4.3 | 80 |
| Oleyl Alcohol | 6.0 | 3.1 | 68 |

The novel method of epoxidation described herein is applicable generally to organic compounds selected from the group consisting of acids, esters and alcohols, said compounds containing an unsaturated aliphatic group, the important members being long chain unsaturated fatty acids, esters thereof of mono-, di- and trihydric alcohols and unsaturated long chain aliphatic alcohols.

What is claimed is:

1. The method of epoxidation of a compound selected from the group consisting of the naturally occurring ethylenic unsaturated higher fatty oils, the acids of such naturally occurring ethylenic unsaturated higher fatty oils and the esters of the acids of such naturally occurring ethylenic unsaturated higher fatty oils with the lower alkyl alcohols which comprises mixing the compound and peracetic acid at a temperature below 20° C., reacting the compound with the peracetic acid by agitation and by maintenance of the temperature below 30° C. for 1 to 3 hours, and then raising the temperature of the reaction mixture to 50° C. to 60° C. by heating the same and continuing heating in that range for one-half hour to two hours substantially to complete the reaction at the double bond of the compound.

2. The method of claim 1, in which the compound is an ester of soy bean oil acids.

3. The method of claim 1, in which the compound is oleic acid.

4. The method of claim 1, in which the compound is an ester of oleic acid.

References Cited in the file of this patent

UNITED STATES PATENTS

| Number | Name | Date |
|---|---|---|
| 2,485,160 | Niederhauser | Oct. 18, 1949 |

OTHER REFERENCES

Findley, J. Amer. Chem. Soc., Mar. 1945, pp. 412–414.